US008599935B2

(12) United States Patent
Kawashima et al.

(10) Patent No.: US 8,599,935 B2
(45) Date of Patent: Dec. 3, 2013

(54) MOVING IMAGE DECODING APPARATUS AND MOVING IMAGE DECODING METHOD

(75) Inventors: Yuji Kawashima, Tokyo (JP); Yoshihiro Kikuchi, Tokyo (JP); Tatsuro Fujisawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1841 days.

(21) Appl. No.: 11/699,037

(22) Filed: Jan. 29, 2007

(65) Prior Publication Data

US 2007/0189735 A1 Aug. 16, 2007

(30) Foreign Application Priority Data

Jan. 31, 2006 (JP) ................................. 2006-023158

(51) Int. Cl.
*H04N 7/12* (2006.01)
(52) U.S. Cl.
USPC ............. 375/240.29; 375/240.23; 375/240.24
(58) Field of Classification Search
USPC .................................. 375/240.29; 380/240.29
See application file for complete search history.

(56) References Cited

U.S. PATENT DOCUMENTS

| 7,126,989 | B2 | 10/2006 | Hagai et al. | |
| 7,430,336 | B2 * | 9/2008 | Raveendran | 382/268 |
| 7,911,538 | B2 * | 3/2011 | Ha et al. | 348/607 |
| 2005/0117653 | A1 * | 6/2005 | Sankaran | 375/240.24 |
| 2005/0243913 | A1 * | 11/2005 | Kwon et al. | 375/240.03 |

FOREIGN PATENT DOCUMENTS

| JP | 2001-2452294 A1 | 9/2001 |
| JP | 2001-346216 | 12/2001 |
| JP | 2006-014301 A | 1/2006 |

OTHER PUBLICATIONS

"A Near Optimal Deblocking Filter for H.264 Advanced Video Coding"; S-Y. Shih , V-R. Chang, Y-L. Lin, Department of Computer Science, National Tsing Hua University, Jan. 25, 2006.*
Japanese Office Action with English translation corresponding to Japanese Application No. 2006-023158, dated Jan. 4, 2011.
Japanese Office Action dated May 11, 2010 for Appln No. 2006-023158.
Okubo, Sakae et al.; "H.264/AVC Textbook", Japan, Impress, Aug. 11, 2004; First Edition, pp. 140-144.

* cited by examiner

*Primary Examiner* — Mohammad L Rahman
(74) *Attorney, Agent, or Firm* — Pillsbury Winthrop Shaw Pittman LLP

(57) ABSTRACT

According to one embodiment, a moving image decoding apparatus is applied in a video reproducing apparatus and includes a deblocking filter unit for performing deblocking filtering and a processing load detection unit for detecting an intra-unit processing load including a processing load of a decoder. The moving image decoding apparatus sets a judgment threshold value for judging whether or not to perform the deblocking filtering depending on a load level indicating the level of the magnitude of the intra-unit processing load, judges whether or not a processing parameter obtained from adjacent blocks of a plurality of blocks constituting each frame is greater than the judgment threshold value, and conducts control not to perform the deblocking filtering when the processing parameter is smaller than the judgment threshold value.

2 Claims, 10 Drawing Sheets

MOVING IMAGE DECODING APPARATUS AND MOVING IMAGE DECODING METHOD

CROSS-REFERENCE TO RELATED APPLICATIONS

This application is based upon and claims the benefit of priority from Japanese Patent Application No. 2006-23158, filed Jan. 31, 2006, the entire contents of which are incorporated herein by reference.

BACKGROUND

1. Field

One embodiment of the invention relates to a moving image decoding apparatus and a moving image decoding method each decoding a compressed moving image stream, applicable in a data reproducing apparatus and a data recording and reproducing apparatus such as a DVD player, a DVD recorder, and so on.

2. Description of the Related Art

Conventionally, there have been a data reproducing apparatus and a data recording and reproducing apparatus each capable of recording or reproducing video and sound as digital data. As these kinds of apparatuses, a DVD player and a DVD recorder both using a DVD (digital versatile disk) as a recording medium are widely used, the DVD player reading digital data recorded on the recording medium to reproduce video and sound, and the DVD recorder capable of recording digital data on the recording medium and reading digital data recorded on the recording medium to reproduce video and sound.

In such a DVD player and a DVD recorder, a decoder (decoding apparatus) is provided for decoding a moving image stream compression coded by a moving image coding system such as MPEG 2, MPEG 4, or the like. For a software decoder in which the decoder performs decoding by software, the compression coded moving image stream can be decoded by processing of a processor (CPU: Central Processing Unit) without providing dedicated hardware.

On the other hand, when decoding the compression coded moving image stream by the coding system such as MPEG 2, MPEG 4 or the like, there occurs noise typical to the coding system, such as block noise or edge noise because the image processing is performed on a block basis. Hence, a moving image reproducing apparatus has been conventionally known in which a post filter is located for removing those noises. For example, Japanese Patent Publication (KOKAI) No. 2001-245294 discloses a moving image reproducing apparatus in which filtering performed by the post filter (post filtering) on a decoded moving image signal is changed based on a reproduction status of the moving image signal to reduce time required for the post filtering so as to prevent occurrence of frame omission.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a moving image decoding apparatus is applied in a video reproducing apparatus and includes a deblocking filter for performing deblocking filtering and a processing load detection unit for detecting an intra-unit processing load including a processing load of a decoder. The moving image decoding apparatus sets a judgment threshold value for judging whether or not to perform the deblocking filtering depending on a load level indicating the level of the magnitude of the intra-unit processing load, judges whether or not a processing parameter obtained from adjacent blocks of a plurality of blocks constituting each frame is greater than the judgment threshold value, and conducts control not to perform the deblocking filtering when the processing parameter is smaller than the judgment threshold value.

Figure 1:
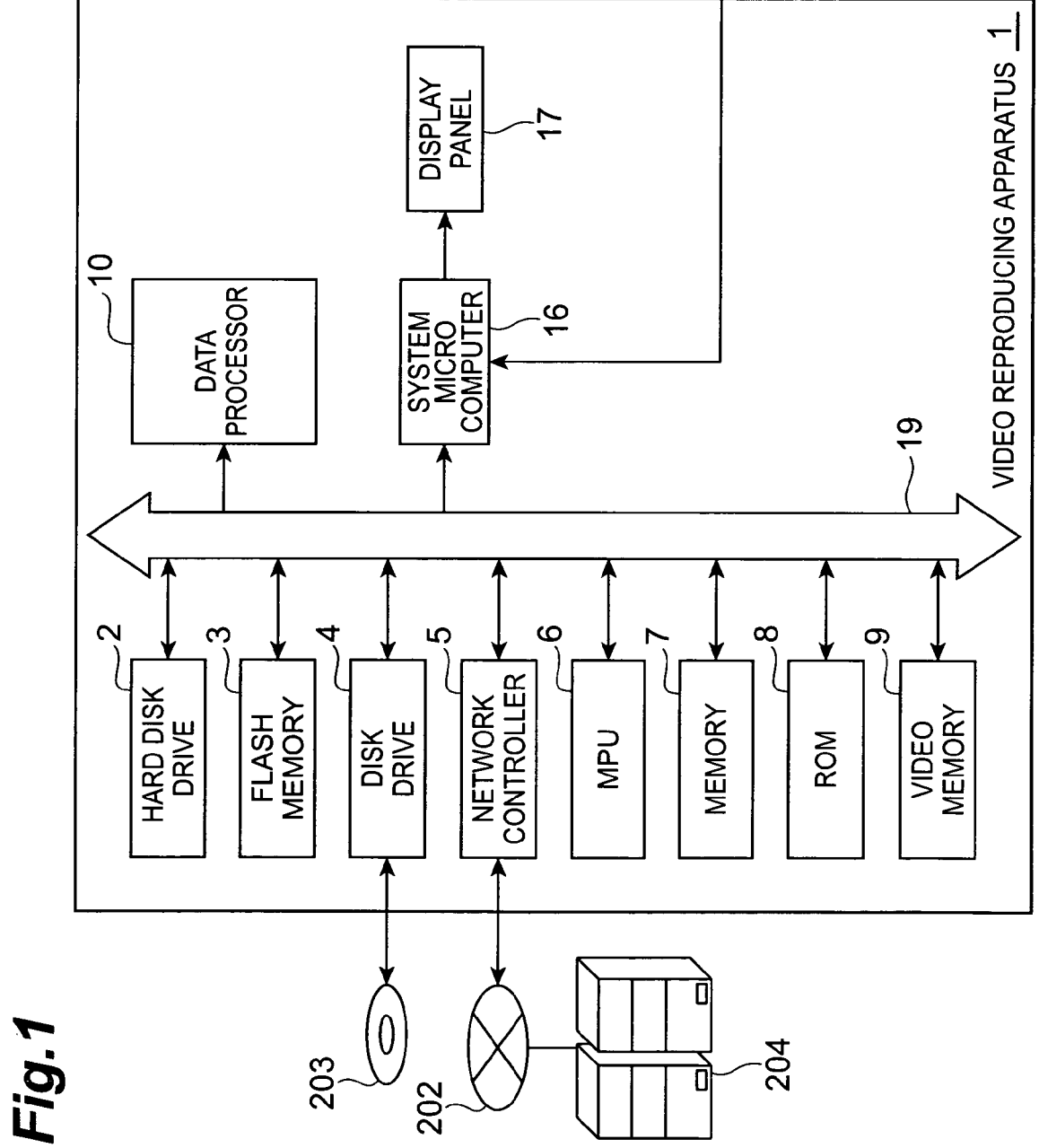
FIG. 1 is an exemplary block diagram showing the internal configuration of a video reproducing apparatus in which a moving image decoding apparatus according to an embodiment of the present invention is applied, together with a recording medium and a network storage.

A moving image decoding apparatus 100 according to an embodiment of the present invention is included in a video reproducing apparatus 1 shown in FIG. 1. FIG. 1 is a block diagram showing the internal configuration of the video reproducing apparatus 1 together with a recording medium 203 and a network storage 204. As shown in FIG. 1, the video reproducing apparatus 1 inserts the recording medium 203 such as an optical disk or the like. The video reproducing apparatus 1 has a configuration in which it can read video content data (data for reproducing movie, drama, and so on) in a digital form recorded on the recording medium 203 to reproduce video contents and interactive data (data including menu data, animation data, and sound effect data which are reproduced in relation to the video contents, content explanation data such as explanation of the video contents and so on, and data including questions of quiz and so on), and can connect to the network storage 204 via the Internet 202 to acquire the video content data also from the network storage 204 to reproduce the video contents and interactive data.

The video reproducing apparatus 1 has a hard disk drive 2, a flash memory 3, a disk drive 4, and a network controller 5 all of which are connected to a bus 19. The hard disk drive 2 records digital data such as the video content data and the like on a magnetic disk rotated at a high speed to read/write the digital data. The flash memory 3 stores digital data such as the video content data and the like, from/to which the digital data is read/written. The disk drive 4 has a function of reading the digital data such as the video content data and the like from the recording medium 203 and outputting a reproduced signal. The network controller 5 controls reading/writing of the digital data such as the video content data and the like performed to/from the network storage 204 via the Internet 202.

The video reproducing apparatus 1 further has an MPU (Micro Processing Unit) 6, a memory 7, a ROM 8, and a video memory 9 all of which are connected to the bus 19. The MPU 6 is booted according to a boot program read out from the ROM 8 to the memory 7. The MPU 6 also reads out a player program from the ROM 8 to the memory 7 and, according to the player program, controls system initialization, system termination and so on to thereby control processing of a system microcomputer 16. In addition, the MPU 6 instructs a later-described data processor 10 to reproduce video and sound from the video content data read out from any of the recording medium 203, the network storage 204, the hard disk drive 2, and the flash memory 3. The memory 7 stores the data and programs used when the MPU 6 operates. The ROM 8 stores programs executed by the MPU 6 such as the boot program and the player program, programs executed by the data processor 10 (for example, a video reproducing program for decoding the compression coded moving image/sound data such as the video content data and so on to reproduce video and sound) and permanent data. Into the video memory 9, later-described decoded decode image data D is written in sequence.

The data processor 10 operates according to the video reproducing program to separate the compression coded moving image/sound data into moving image data and sound data, decodes the data respectively to reproduce video and sound. The system microcomputer 16 causes a display panel 17 to display reproduction information on video contents and inputs an operation input signal inputted from a user input device 18 (a device which allows for operation input, such as a remote controller or an operation button or the like provided on the video reproducing apparatus 1) into the MPU 6 via the bus 19. The display panel 17 has a liquid crystal display panel and displays various kinds of information on reproduction of video contents and interactive data on the liquid crystal display panel according to the instruction of the system microcomputer 16.

Figure 2:
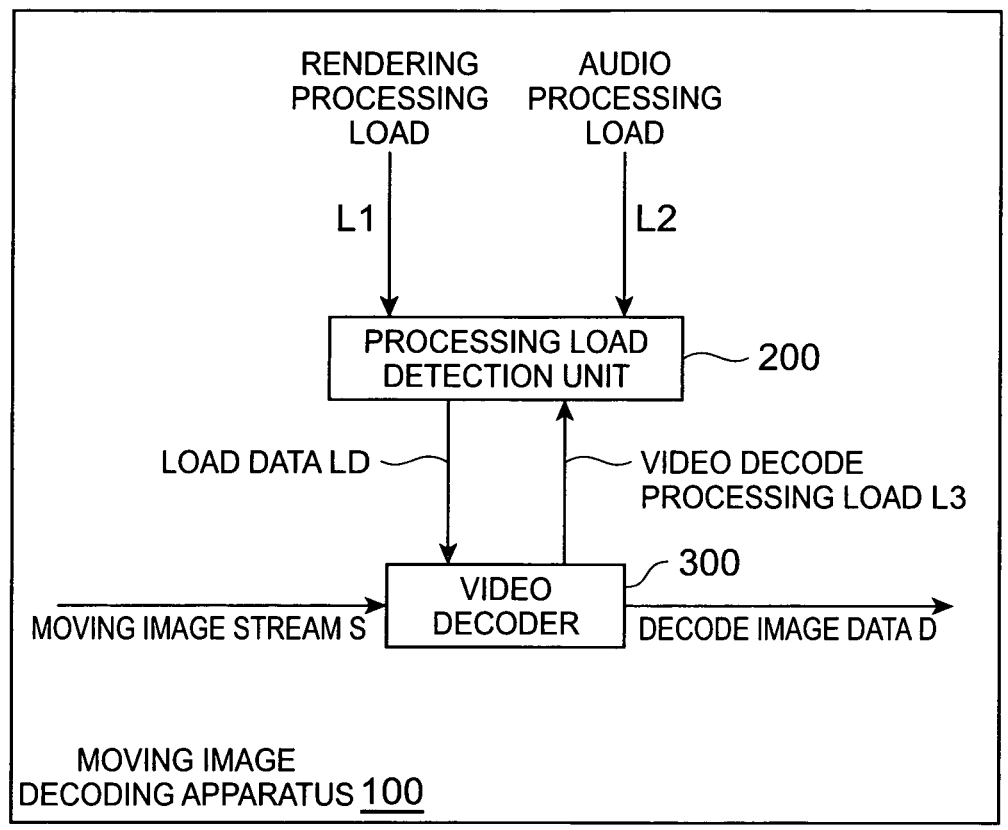
FIG. 2 is an exemplary block diagram showing the internal configuration of the moving image decoding apparatus according to the embodiment of the present invention.

Next, FIG. 2 is a block diagram showing the internal configuration of the moving image decoding apparatus 100 provided in the video reproducing apparatus 1. The moving image decoding apparatus 100 is a software decoder realized by a moving image decoding processing program configured as one module of the video reproducing program. The moving image decoding processing program is software for decoding moving image data S (hereinafter referred to as a "moving image stream," such as the video content data) compression coded by a coding system specified by the H.264/AVC standard, and executed by the data processor 10. The moving image decoding processing program has a function corresponding to a processing load detection unit (a processing load detection module in the moving image decoding processing program) 200 and a video decoder (a decode execution module in the moving image decoding processing program) 300 shown in FIG. 2.

The processing load detection unit 200 has a function as a load detection unit for detecting the magnitudes of various kinds of processing loads (hereinafter referred to as a "intra-unit processing load") generated in the video reproducing apparatus 1, including the processing load required for decode in the video decoder 300. In this embodiment, objects of detection as the intra-unit processing load include a rendering processing load L1 required for rendering to visualize the reproduced video data and generate an image to be displayed; an audio processing load L2 required for audio output; and a video decode processing load L3 required for decode in the video decoder 300. The magnitudes of these processing loads (load amounts) are determined, for example, based on the usage rate of the MPU 6 (or the data processor 10). Alternatively, the magnitudes of the processing loads can be determined by combination of the usage rate of the MPU 6 and the usage rate of the ROM 8.

Generally, for smooth operation of the software decoder, a memory (such as the ROM 8) having a certain size or greater is required. With an increased usage rate of the memory, the performance of the software decoder decreases. Therefore, when the magnitude of the intra-unit processing load is detected by combination of the usage rate of the MPU 6 (or the data processor 10) and the usage rate of the ROM 8, it is accurately judged whether or not the load amount causes troubles in the smooth operation of the software decoder.

The processing load detection unit 200 generates load data LD indicating the magnitude of the detected intra-unit processing load and inputs the load data LD into the video decoder 300. The load data LD is used for judgment whether or not the video reproducing apparatus 1 has a load amount which causes troubles in execution of the decode processing in the video decoder 300 (this case being referred to as a later-described high load state).

The video decoder 300, as described later in detail, receives an input of the moving image stream S, performs decode to decompress it or the like, and outputs the decode image data D. Note that, though not shown in FIG. 2, blend processing is performed on the decode image data D. A video output signal corresponding to the blended image after the blend processing is outputted from the video reproducing apparatus 1.

Figure 3:
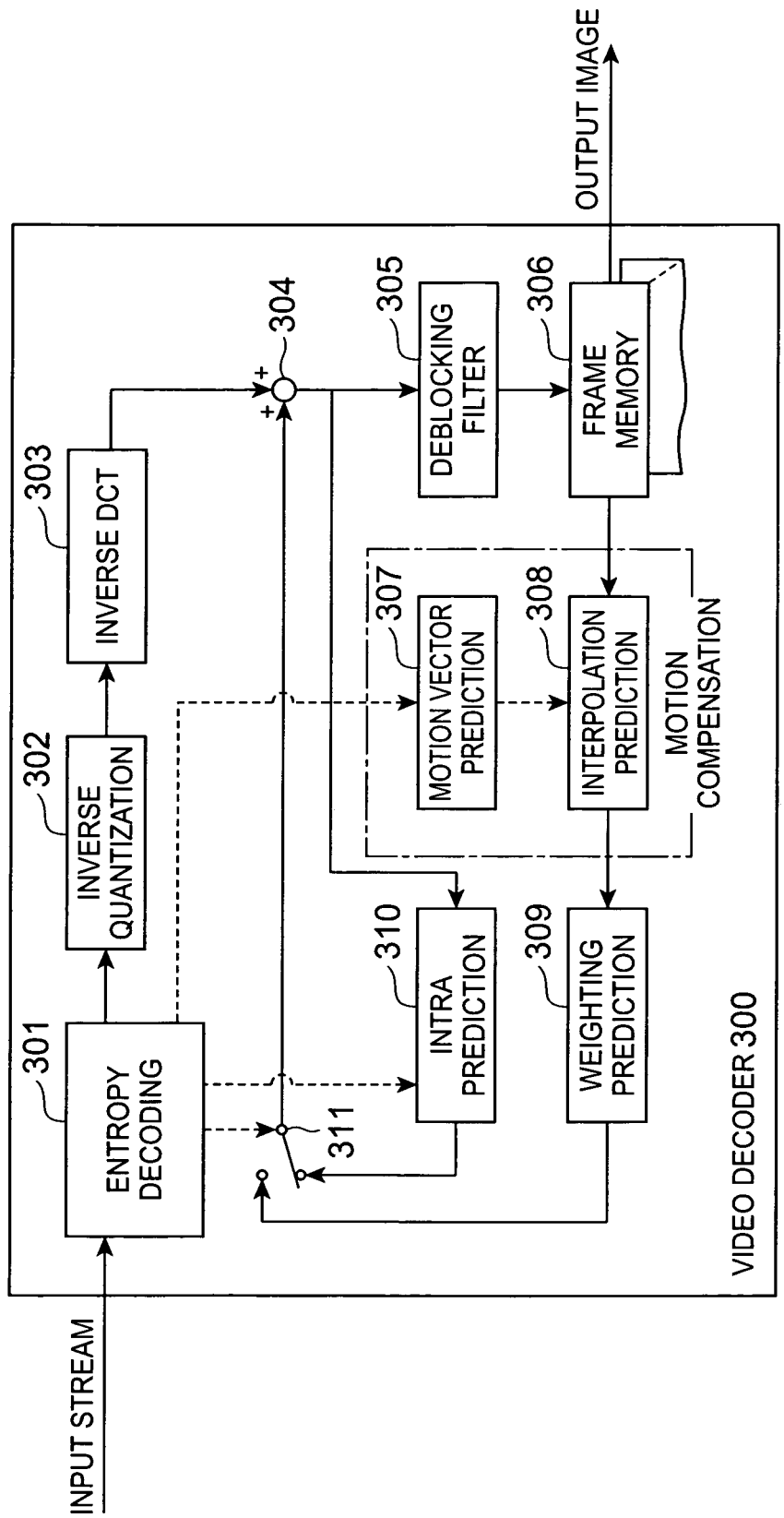
FIG. 3 is an exemplary block diagram showing the internal configuration of a video decoder.

Next, the video decoder 300 will be described with reference to FIG. 3. The video decoder 300, which conforms to the H.264/AVC standard, has an entropy decoding unit 301, an inverse quantizing unit 302, an inverse DCT (Discrete Cosine Transform) unit 303, an adder 304, a deblocking filterunit 305, a frame memory 306, a motion vector prediction unit 307, an interpolation prediction unit 308, a weighting prediction unit 309, and an intra prediction unit 310 and a mode changeover switch 311 as shown in FIG. 3. Note that orthogonal transformation of H.264 is performed with an integer accuracy and therefore different from the conventional DCT, but will be described as DCT in this embodiment.

Figure 4:
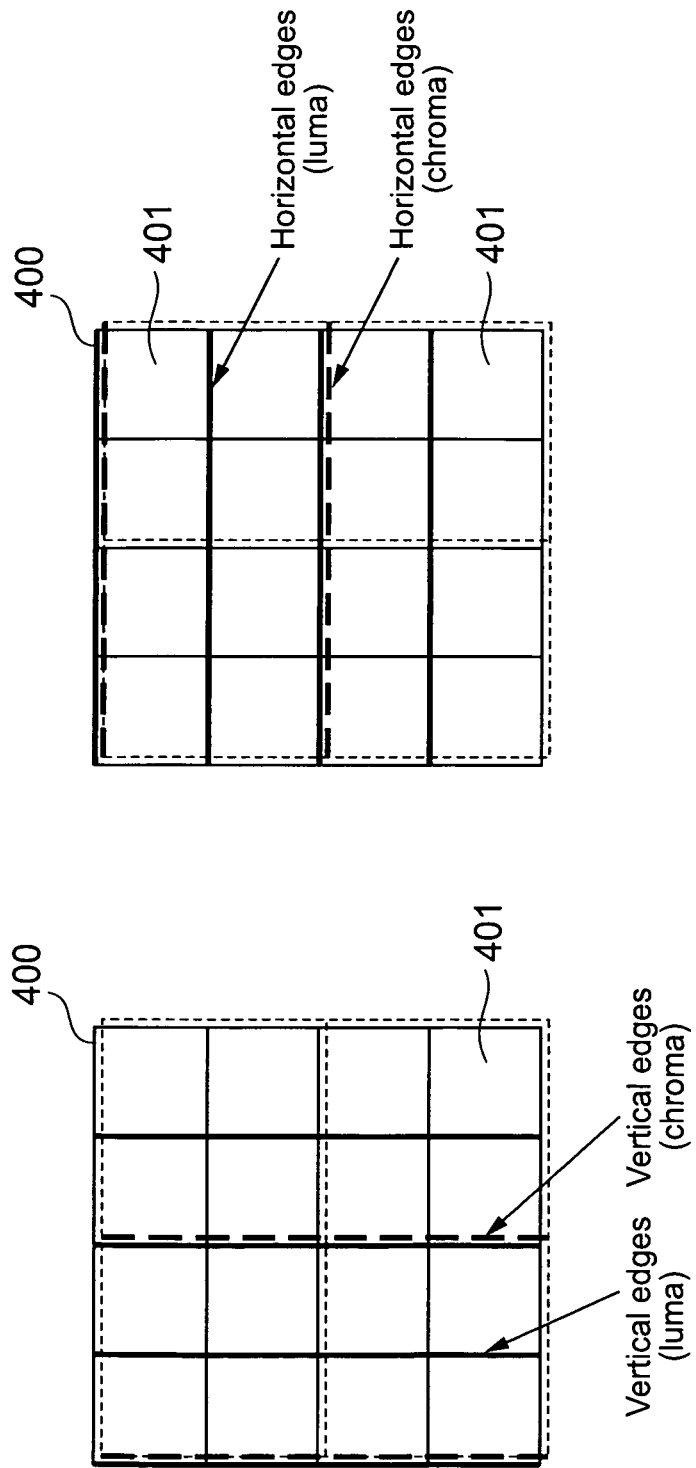
FIG. 4 is an exemplary diagram showing macroblocks together with edges between adjacent blocks.

In the video decoder 300, the frame (picture) constituting the moving image stream S is divided, for example, as a unit of a macroblock 400 composed of 16 blocks, that is, 4×4 blocks as shown in FIG. 4, so that decode is performed for each macroblock 400. Each macroblock 400 is composed of 16 blocks 401. Each block 401 contains 16 pixels, that is, 4×4 pixels.

Any one of an intra-frame coding mode (an intra coding mode) and a motion compensation inter-frame prediction coding mode (an inter coding mode) is selected for each macroblock 400, and decode is then executed.

In the intra coding mode, a prediction signal is generated from a frame to be coded (a coding object frame), and the prediction signal is coded by orthogonal transformation (DCT), quantization and entropy coding. On the other hand, in the motion compensation inter-frame prediction coding mode, a motion compensation inter-frame prediction signal is generated in a predetermined form unit. The motion compensation inter-frame prediction signal is generated to detect only a portion different from the frame which has been already coded, as changed portion, and use the portion to estimate the motion. A prediction error signal obtained by subtracting the motion compensation inter-frame prediction signal from the coding object frame is coded by orthogonal transformation (DCT), quantization and entropy coding.

Note that a codec conforming to the H.264/AVC standard uses techniques shown in the following (1) to (6) to further increase the compression rate:
 (1) motion compensation with a pixel accuracy (¼ pixel accuracy) higher than that in the conventional MPEG;
 (2) intra-frame prediction to efficiently perform the intra-frame coding;
 (3) deblocking filter for decreasing block distortion;
 (4) integer DCT in a unit of 4×4 pixels;
 (5) multi reference frame capable of using a plurality of frames at an arbitrary position as a reference screen; and
 (6) weighting prediction.

Next, the operation of the video coder 300 as the software decoder shown in FIG. 3 will be described. The moving image stream S is first inputted into the entropy decoding unit 301. The moving image stream S contains motion vector data used in the motion compensation inter-frame prediction coding (inter prediction coding), intra-frame prediction data used in the intra-frame prediction coding (intra prediction coding), mode data indicating the prediction mode (the inter prediction coding/intra prediction coding) and so on, in addition to the coded moving image data.

The entropy decoding unit 301 performs entropy decoding processing such as variable length decoding on the moving image stream S, separates a quantized DCT coefficient, the motion vector data, the intra-frame prediction data and the mode data from the inputted moving image stream S and outputs them. In this case, for example, each macroblock 400 in a frame to be decoded (a decoding object frame) is processed in the entropy decoding unit 301 on a block 401 basis. It is assumed hereinafter that the block 401 is composed of 4×4 pixels, so that the block 401 is converted into 4×4 quantized DCT coefficients. It should be noted that the block 401 may be composed of 8×8 pixels.

Of the data outputted from the entropy decoding unit 301, the motion vector data is then inputted into the motion vector prediction unit 307, and the intra-frame prediction data is inputted into the intra prediction unit 310. Besides, the mode data is inputted into the mode changeover switch 311.

The inverse quantizing unit 302 performs inverse quantization processing to convert the 4×4 quantized DCT coefficients of the block 401 being a decoding object into 4×4 DCT coefficients (orthogonal transformation coefficients). Further, the inverse DCT unit 303 performs inverse integer DCT (inverse orthogonal transformation) processing to convert the 4×4 DCT coefficients into 4×4 pixel values from the frequency data. The 4×4 pixel values are a prediction error signal corresponding to the block 401 being the decoding object. The prediction error signal is inputted into the adder 304. The adder 304 adds a prediction signal (the motion compensation inter-frame prediction signal or the intra-frame prediction signal) corresponding to the block 401 being the decoding object to the prediction error signal inputted thereinto. This decodes the 4×4 pixel values corresponding to the block 401 being the decoding object.

In this manner, in the video decoder 300, processing of adding the prediction signal (the motion compensation inter-frame prediction signal or the intra-frame prediction signal) to the prediction error signal corresponding to a block 401 being a decoding object to decode a decoding object frame is executed for each block 401.

Note that, in the intra prediction mode, the intra prediction unit 310 is selected by the mode changeover switch 311. Therefore, the intra-frame prediction signal from the intra prediction unit 310 is added to the prediction error signal by the adder 304. On the other hand, in the inter prediction mode, the weighting prediction unit 309 is selected by the mode changeover switch 311. Therefore, the motion compensation inter-frame prediction signal obtained by the motion vector prediction unit 307, the interpolation prediction unit 308, and the weighting prediction unit 309 is added to the prediction error signal.

Each decoded frame is then subjected to deblocking filtering by the deblocking filter unit 305. The deblocking filter unit 305 performs deblocking filtering to reduce block noise on each frame decoded, for example, in a unit of the block 401 composed of 4×4 pixels. Though described later in detail, the deblocking filtering unit processing of eliminating a difference in level at locations on some edges between the adjacent blocks 401 of the edges contained in the macroblock 400 where the difference interferes with the continuity so as to smooth the difference in level as shown in FIG. 4. Note that not all of the edges between the blocks 401 but edges where the difference in level needs to be eliminated for smoothness are objects of deblocking filtering.

The deblocking filtering prevents block distortion from being contained in the reference image with the result that the block distortion is propagated into the decoded image. The processing amount of the deblocking filtering by the deblocking filter unit 305 is enormous and may occupy 50% of the total processing amount of the video decoder 300. The deblocking filtering by the deblocking filter unit 305 is adaptively executed such that stronger filtering is performed on a location where block distortion easily occurs, while weaker filtering is performed on a location where block distortion hardly occurs. The deblocking filtering is realized by loop filtering.

Each frame which has been subjected to the deblocking filtering is then stored in the frame memory 306 and read out from the frame memory 306 as an output frame (or an output image field).

Note that each frame (reference frame) to be used as the reference image for the motion compensation inter-frame prediction is stored in the frame memory 306 for a fixed period. Further, in the motion compensation inter-frame prediction coding under the H.264/AVC standard, a plurality of frames can be used as the reference screen (the multi reference frame). Therefore, the frame memory 306 has a plurality of memories for storing the plurality of frames.

The motion vector prediction unit 307 then generates motion vector difference data based on the motion vector data corresponding to the block 401 being the decoding object. The interpolation prediction unit 308 generates the motion compensation inter-frame prediction signal from a pixel group with an integer accuracy and a prediction interpolation pixel group with a ¼ pixel accuracy in the reference frame, based on the motion vector difference data corresponding to the block 401 being the decoding object. Note that in generation of the prediction interpolation pixel with the ¼ pixel accuracy, a 6-tap filter (6 inputs and 1 output) is used. Therefore, the prediction interpolation processing with a high accuracy in consideration also of a high frequency component can be executed, but an accordingly large processing amount is required for the motion compensation.

The weighting prediction unit 309 executes processing of multiplying the motion compensation inter-frame prediction signal by the weighting coefficient (weighting prediction) on a compensation block basis to generate a weighted motion compensation inter-frame prediction signal. This weighting prediction is processing to predict the brightness of the decoding object frame. The weighting prediction processing can improve the image quality of the moving image having a brightness varying with time such as fade-in and fade-out. The processing amount required for the video decoder 300, however, accordingly increases.

The intra prediction unit 310 generates, from the decoding object frame, the intra-frame prediction signal of the block 401 being the decoding object contained in the frame. The intra prediction unit 310 executes intra-screen prediction processing in accordance with the intra-frame prediction data inputted from the entropy decoding unit 301. The intra prediction unit 310 generates the intra-frame prediction signal from the pixel values in another block 401 of the blocks 401 existing in the same frame with the block 401 being the decoding object which is close to the block 401 being the decoding object and has been already decoded. The intra-frame prediction (intra prediction) is a technique of increasing the compression rate using the pixel correlation between blocks. In the intra-frame prediction, one of four kinds of prediction modes including vertical prediction (prediction mode 0), horizontal prediction (prediction mode 1), average value prediction (prediction mode 3), and plane prediction (prediction mode 4) is selected for each intra-frame prediction block (for example, 16×16 pixels) according to the intra-frame prediction data. Note that the frequency of selection of the plane prediction is lower than those of the other intra-frame prediction modes, but the processing amount required for the plane prediction is larger than that of any of the other intra-frame prediction modes.

Figure 6:
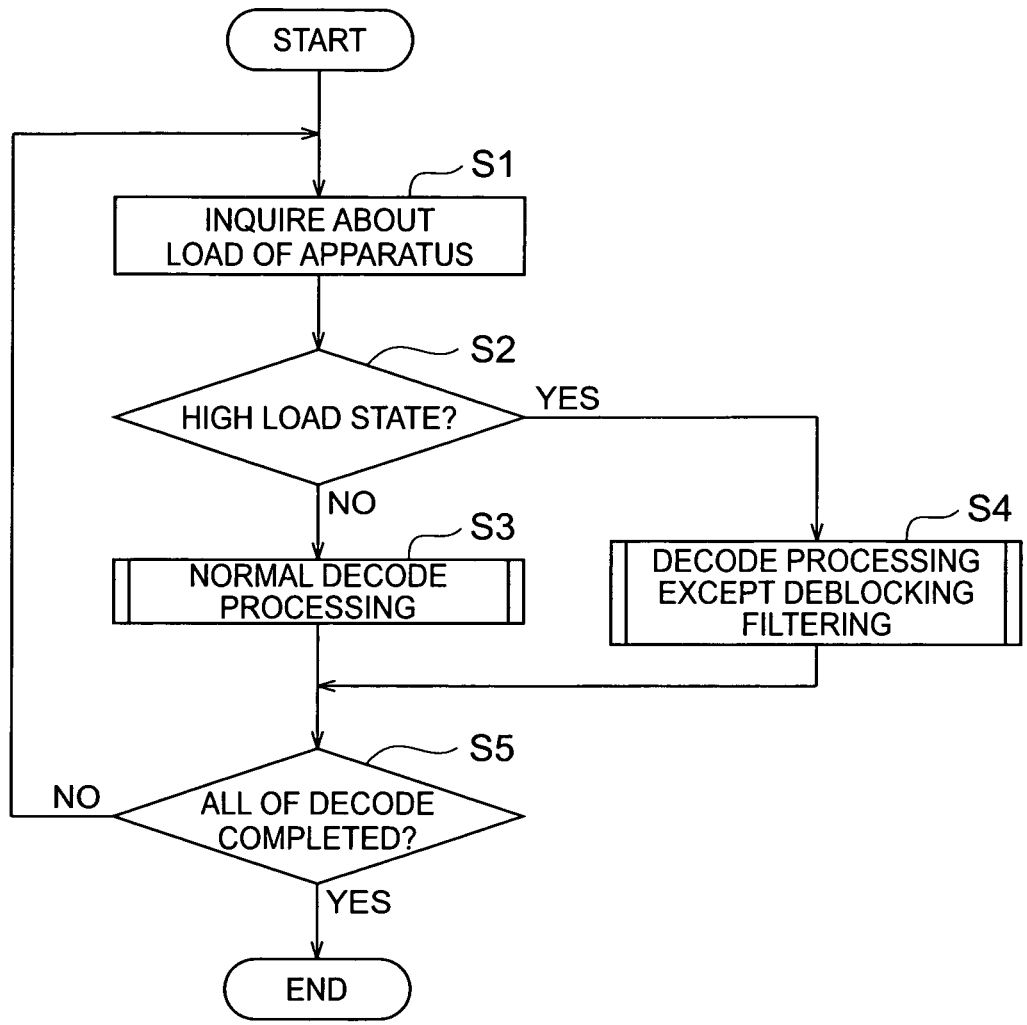
FIG. 6 is an exemplary flowchart showing the operation procedure of decode processing by the moving image decoding apparatus.

The moving image decoding apparatus 100 in this embodiment is configured such that, to make it possible to decode the moving image stream S in real time within a limited time even if the intra-unit processing load is increased, all of the decode processing (hereinafter referred to as "normal decode processing") including the above-described deblocking filtering and special decode processing (processing made by omitting only the deblocking filtering from the normal decode processing) are selectively executed according to the magnitude of the intra-unit processing load along the flowchart shown in FIG. 6. Note that in the special decode processing, the execution of the deblocking filtering is skipped. Therefore, the interpolation prediction unit 308 will generate the motion compensation inter-frame prediction signal corresponding to the decoding object frame using, as the reference frame, one or more decoded frames prior to being subjected to the deblocking filtering rather than the frame which has been already subjected to the deblocking filtering.

Hereinafter, the operation procedure of the decode processing by the moving image decoding apparatus 100 will be described with reference to the flowchart in FIG. 6. Note that when the decode processing is performed along the flowchart shown in FIG. 6, the data processor 10 executes a moving image decoding program to operate as a control unit according to the embodiment of the present invention.

Upon start of the decode processing by the moving image decoding processing program, the data processor 10 proceeds to step 1 to inquire about the current load of the video reproducing apparatus 1. In this case, the magnitude of the intra-unit processing load is detected by the processing load detection unit 200 based on the usage rate or the like of the data processor 10, and the load data LD is inputted into the video decoder 300.

Next, the data processor 10 proceeds to step 2 to judge whether or not the video reproducing apparatus 1 is in a high load state depending on whether or not the current load of the video reproducing apparatus 1 is greater than a predetermined reference value, based on the load data LD inputted in step 1.

When it is judged that the video reproducing apparatus 1 is not in the high load state, then the data processor 10 proceeds to step 3. In this case, the data processor 10 selects the normal decode processing to execute a series of decode processing described above including the deblocking filtering. Accordingly, unless the video reproducing apparatus 1 comes into the high load state, that is, unless decode performance decreases, the moving image stream S is decoded in the normal decode processing.

On the other hand, when it is judged that the video reproducing apparatus 1 is in the high load state, then the data processor 10 proceeds to step 4 to select the above-described special decode processing as the decode processing to be executed in which the data processor 10 executes the remaining processing of the above-described series of decode processing by the video decoder 300 except the deblocking filtering. In this case, the decoded frame prior to being subjected to the deblocking filtering is stored in the frame memory 306. Therefore, the motion compensation inter-frame prediction signal corresponding to the decoding object frame is generated using one or more decoded frames prior to being subjected to the deblocking filtering.

Omission of execution of the deblocking filtering in the above manner allows significant reduction of the processing required for decode per frame though there is a possibility that the moving image containing block distortion is reproduced. Accordingly, even if the video reproducing apparatus 1 comes into the high load state because other programs are being executed during execution of the decode processing, problems such as frame omission, extreme delay in the motion of an object and the like never occur. Further, the decode and reproduction of the moving image data can be executed smoothly and continuously.

Besides, in the video decoder 300, the decode processing is performed according to the following procedure 1), procedure 2), and procedure 3), focusing on the processing parameters used in performing the deblocking filtering.

Figure 5:
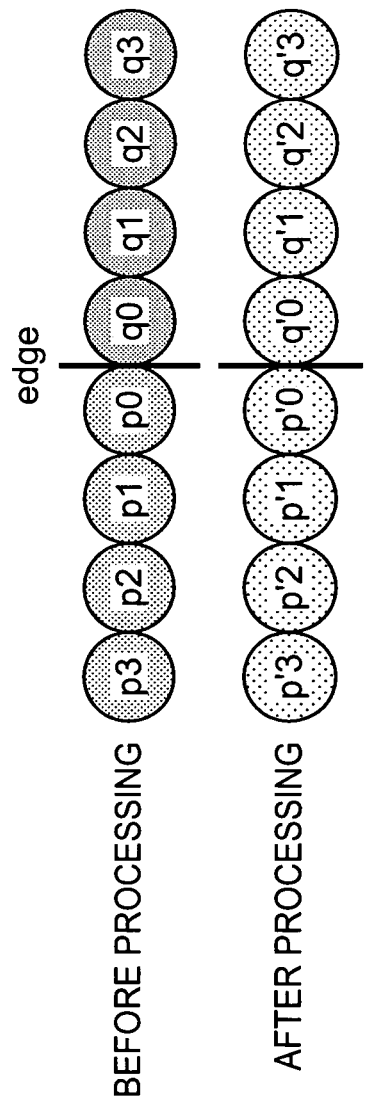
FIG. 5 is an exemplary diagram showing the procedure of deblocking filtering.

As shown in FIG. 5, it is assumed here that, as for the two adjacent 4×4 pixel-blocks 401, the pixel values before the deblocking filtering are p0, p1, p2, and p3, and q0, q1, q2, and q3, and the pixel values after the deblocking filtering are p'0, p'1, p'2, and p'3, and q'0, q'1, q'2, and q'3.

For the adjacent blocks 401 constituted of the pixel values p0, p1, p2, and p3, and q0, q1, q2, and q3, Boundary Strength (hereinafter, referred to as "bS") values are determined. The bS is a strength parameter indicating the filter strength at the block boundary. The bS takes 1 to 4 such that stronger filtering is employed for a bS of a larger value. More specifically, filtering is not uniformly performed on the block boundaries, but the degree of filtering to be performed is determined depending on the conditions, such as whether the block boundary is a boundary between the macroblocks 400, whether the boundary is for intra-frame coding or for inter-frame coding, whether intra-frame prediction has been performed, and so on.

Figure 7:
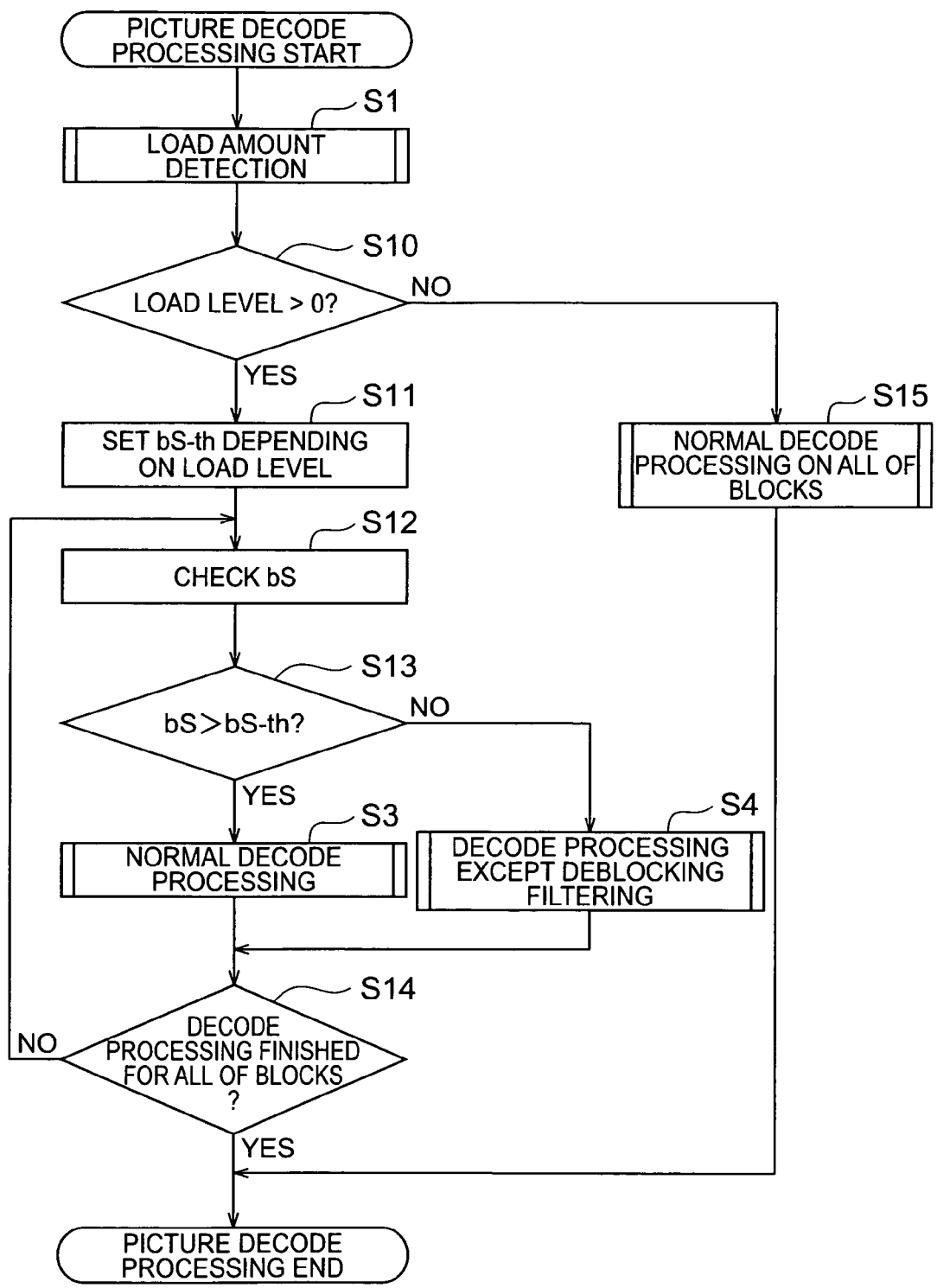
FIG. 7 is an exemplary flowchart showing the operation procedure of picture decode processing when using bS.

In the procedure 1), the decode processing is performed focusing on the bS as the processing parameter to conduct control such that the deblocking filtering is performed only on the edge having a bS greater than a later-described judgment threshold value. In this procedure 1), the data processor 10 performs the decode processing along the flowchart shown in FIG. 7. FIG. 7 is a flowchart showing the operation procedure of the decode processing (picture decode processing) for the decoding object frame by the procedure 1).

The data processor 10 executes step 1 to detect the magnitude of the intra-unit processing load by the processing load detection unit 200 in a manner similar to that of the above, and set four load levels (load levels 0, 1, 2, and 3, a larger number indicating a state of a higher load level) indicating the levels of the magnitude of the intra-unit processing load depending on the magnitude of the detected intra-unit processing load (the load data LD). The data processor 10 then proceeds to step 10 to judge whether or not the load level set in step 1 is greater than 0. When the load level is greater than 0, the data processor 10 proceeds to step 11. However, when the load level is 0, the magnitude of the intra-unit processing load is small, and therefore it is believed that there is no problem even if the deblocking filtering is performed on all of the blocks 401. Accordingly, in this case, the data processor 10 proceeds to step 15 to perform the normal decode processing on all of the blocks 401 in the decoding object frame.

At the time when proceeding to step 11, the data processor 10 operates as a threshold value setting unit to set a judgment threshold value (bS-th) for judging whether or not to perform the deblocking filtering, depending on the load level (the bS-th being set to any of the three values "1," "2," and "3"). Next, the data processor 10 proceeds to step 12 to calculate the bS of the block 401 being an object of the deblocking filtering (bS check). In the subsequent step 13, the data processor 10 judges whether or not the bS calculated in step 12 is greater than the bS-th. When it is judged that the bS is greater than the bS-th (in other words, in this case, when strong filtering is required), the data processor 10 proceeds to step 3 to perform the normal decode processing. When it is not judged that the bS is greater than the bS-th (when the bS is smaller than the bS-th), that is, when strong filtering is not required, the data processor 10 proceeds to step 4 to perform the special decode processing. In this case, the remaining processing of the above-described series of decode processing by the video decoder 300 except the deblocking filtering is executed. In step 14, it is judged whether or not the decode processing has been finished for all of the blocks 401, and when finished, the picture decode processing ends. Otherwise, the data processor 10 returns to step 12 to repeat the above-described processing.

The processing performed as described above makes it possible to finely adjust whether or not to perform the deblocking filtering on a block basis rather than on a frame basis. It is possible to perform the deblocking filtering only on the block requiring strong filtering and omit the deblocking filtering on the block requiring no strong filtering.

Thus, it is possible not only to significantly reduce the processing amount required for decode for each frame but also to appropriately omit the deblocking filtering according to the processing parameter. In addition, the judgment threshold value (bS-th) for judging whether or not to perform the deblocking filtering is set depending on the load level so that the deblocking filtering is performed only on the edge having a higher bS as the load level becomes higher. Therefore, whether or not to perform the deblocking filtering changes depending on the magnitude of the intra-unit processing load in the video reproducing apparatus 1, such that whether or not to perform the deblocking filtering depends on the magnitude of the intra-unit processing load even for the same filtering strength. Accordingly, in terms of the bS, even when strong filtering is not required, the deblocking filtering may be performed when the magnitude of the intra-unit processing load in the video reproducing apparatus 1 is small, with the result that a high quality moving image with less block distortion can be reproduced.

In the procedure 2), the decode processing is performed focusing on a clipping value tc as the processing parameter. The clopping value tc is a parameter present when the above-described bS is 1 to 3 as shown in the calculation equations in FIG. 5, and is a variation parameter in the present invention indicating the clipping value of a pixel variation for a pixel of filtering object. Similarly to the bS, also for the clipping value tc, a larger value indicates a higher filtering strength.

The pixel variation is greater at the edge with a higher filtering strength. Therefore, if the deblocking filtering is omitted, errors in pixels are accumulated to cause a larger difference from the right decoded image. Hence, the deblocking filtering for the edge with a lower filtering strength is preferentially omitted.

Figure 8:
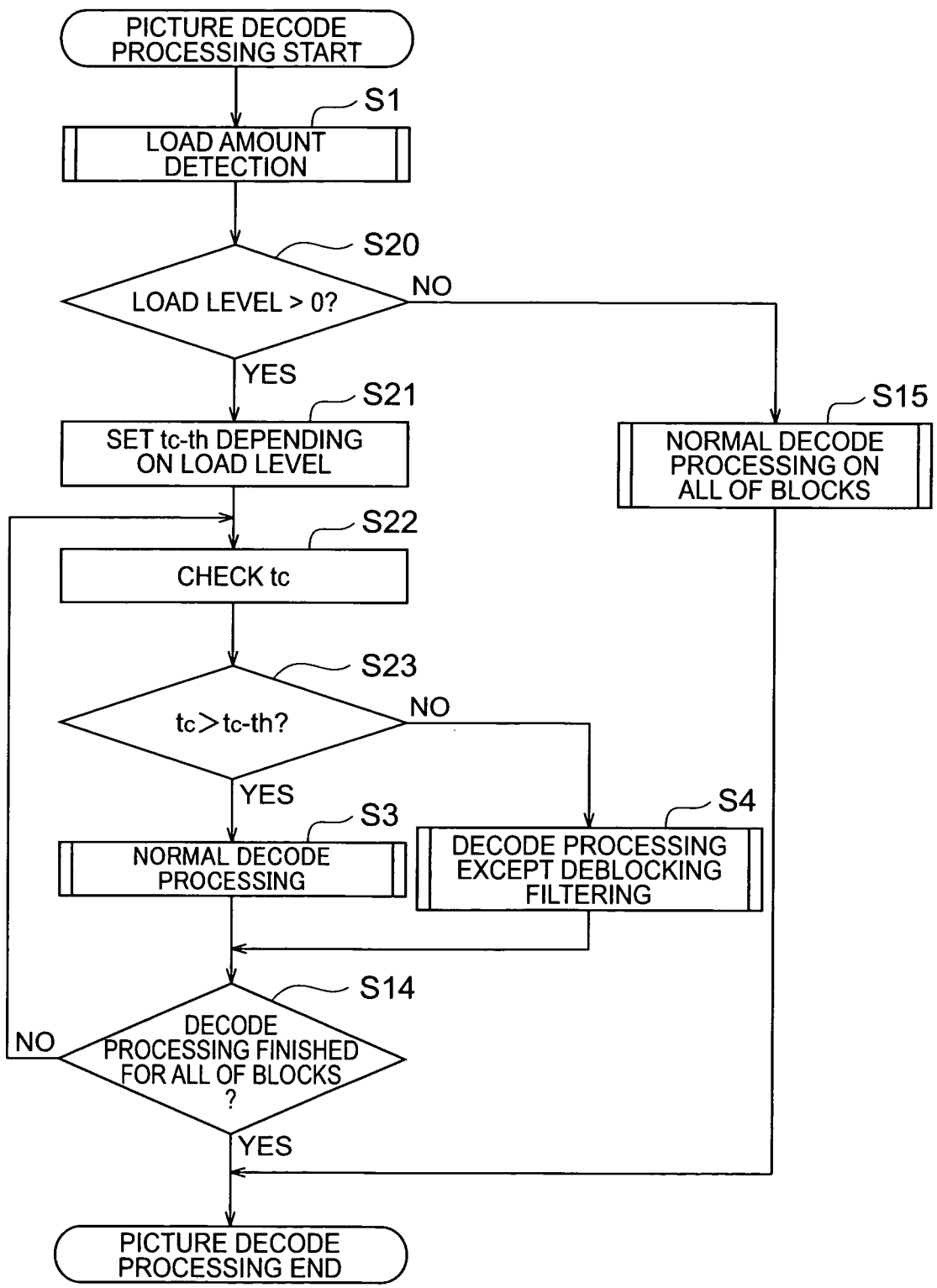
FIG. 8 is an exemplary flowchart showing the operation procedure of the picture decode processing when using tc.

In the procedure 2), the data processor 10 performs the decode processing along the flowchart shown in FIG. 8. The following description will be presented mainly for different points from the procedure 1), and the description of common points will be omitted or simplified. FIG. 8 is a flowchart showing the operation procedure of the decode processing (picture decode processing) for the decoding object frame by the procedure 2).

The data processor 10 executes step 1 in a similar manner to that in the procedure 1) to set a plurality of load levels (0, 1, 2, 3 . . . L (maximum level)) indicating the levels of the magnitude of the intra-unit processing load depending on the magnitude of the detected intra-unit processing load. When proceeding to step 20, the data processor 10 judges whether or not the load level set in step 1 is greater than 0, and when the load level is greater than 0, the data processor 10 proceeds to step 21. When the load level is 0, the data processor 10 proceeds to step 15 to perform the normal decode processing on all of the blocks 401 in the decoding object frame.

At the time when proceeding to step 21, the data processor 10 operates as a threshold value setting unit to set a judgment threshold value (tc-th) for judging whether or not to perform the deblocking filtering depending on the load level (the tc-th being set to any of 1, 2, 3 . . . L). Next, the data processor 10 proceeds to step 22 to calculate the tc for the block 401 being an object of the deblocking filtering (tc check). In the subsequent step 23, the data processor 10 judges whether or not the tc calculated in step 22 is greater than the tc-th. When it is judged here that the tc is greater than the tc-th (in other words, in this case, when strong filtering is required), the data processor 10 proceeds to step 3 to perform the normal decode processing. When it is not judged that the tc is greater than the tc-th (that is, when strong filtering is not required), the data processor 10 proceeds to step 4 to execute the special decode processing in which the remaining processing of the above-described series of decode processing by the video decoder 300 except the deblocking filtering is performed. Hereafter, the procedure 2) is performed similarly to the procedure 1). Also in the case by the procedure 2), the same operation and effect as those in the procedure 1) are presented.

In the procedure 3), the decode processing is performed focusing, as processing parameters, on an evaluation parameter e as a calculation parameter obtained by calculation processing from the bS and the clipping value tc. The evaluation parameter e is calculated according to the following Expression 1. The evaluation parameter e indicates the value proportional to the filtering strength. In the procedure 3), the deblocking filtering for the edge with an evaluation parameter e smaller than a judgment threshold value θ determined by Expression 2 is omitted.

$$e = \gamma \times bs + \Phi \times tc \quad \text{Expression 1}$$

(where γ and Φ are constants which are 0 or greater)

$$\theta = f(L) \ (L: \text{load level}, f(L): \text{function being a larger value with a higher load level}) \quad \text{Expression 2}$$

Figure 9:
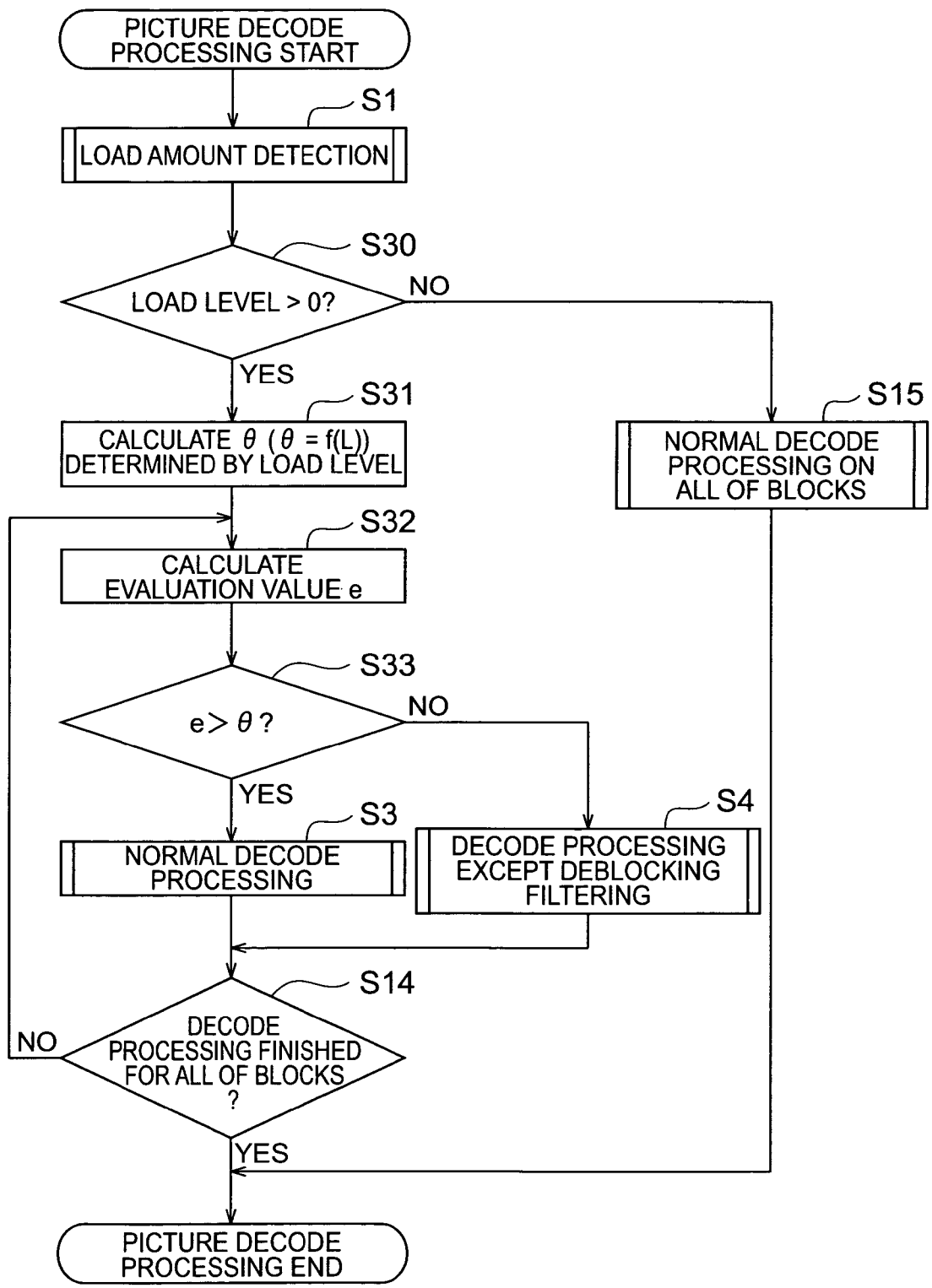
FIG. 9 is an exemplary flowchart showing the operation procedure of picture decode processing when using an evaluation parameter obtained from bS and tc.

In the procedure 3), the data processor 10 performs the decode processing along the flowchart shown in FIG. 9. The following description will be presented mainly for different points from the procedure 1), and the description of common points will be omitted or simplified. FIG. 9 is a flowchart showing the operation procedure of the decode processing (picture decode processing) for the decoding object frame by the procedure 2).

The data processor 10 executes step 1 in a similar manner to that in the procedure 1) to set a plurality of load levels (0, 1, 2, 3 . . . L (maximum level)) indicating the levels of the magnitude of the intra-unit processing load, depending on the magnitude of the detected intra-unit processing load. The data processor 10 proceeds step 30 to judge whether or not the load level set in step 1 is greater than 0, and when the load level is greater than 0, the data processor 10 proceeds to step 31. When the load level is 0, the data processor 10 proceeds to step 15 to perform the normal decode processing on all of the blocks 401 in the decoding object frame.

At the time when proceeding to step 31, the data processor 10 operates as a threshold value setting unit to calculate the judgment threshold value θ determined by the load level trough use of Expression 2. Next, the data processor 10 proceeds to step 32 to calculate the evaluation parameter e following Expression 1. In the subsequent step 33, the data processor 10 judges whether or not the evaluation parameter e calculated in step 32 is greater than the judgment threshold value θ. When it is judged here that the evaluation parameter e is greater than the judgment threshold value θ (in other words, in this case, when strong filtering is required), the data processor 10 proceeds to step 3 to perform the normal decode processing. When it is not judged that that the evaluation parameter e is greater than the judgment threshold value θ (that is, when strong filtering is not required), the data processor 10 proceeds to step 4 to execute the special decode processing in which the remaining processing of the above-described series of decode processing by the video decoder 300 except the deblocking filtering is performed. Hereafter, the procedure 3) is performed similarly to the procedure 1). Also in the case by the procedure 3), the same operation and effect as those in the procedure 1) are presented.

Figure 10:
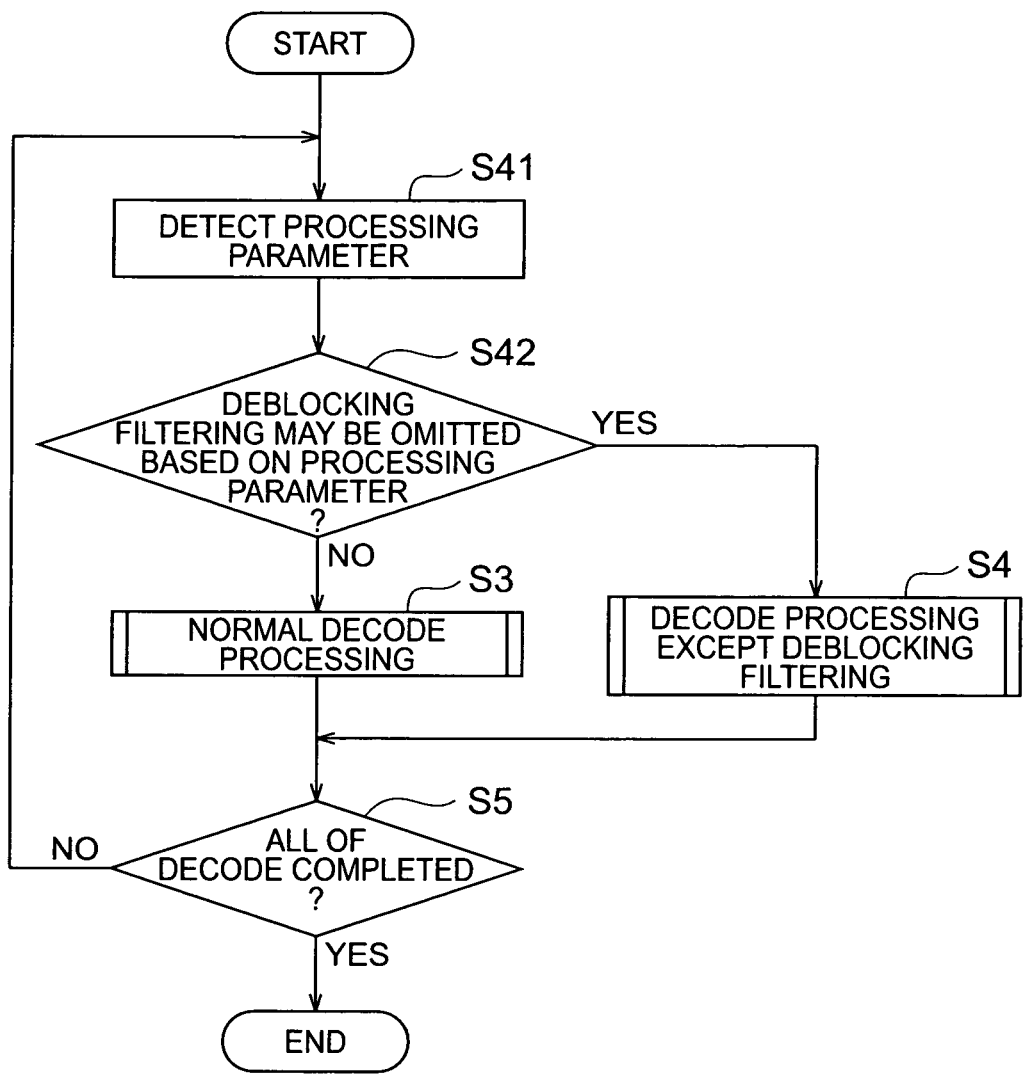
FIG. 10 is an exemplary flowchart showing the operation procedure of other decode processing by the moving image decoding apparatus.

In the above-described decode processing by the moving image decoding apparatus 100, the magnitude of the intra-unit processing load is detected so that the deblocking filtering is omitted for the case of the high load state. In the moving image decoding apparatus 100, it may be judged whether or not to omit the deblocking filtering based on the above-described processing parameters independent from the magnitude of the intra-unit processing load. In this case, the data processor 10 executes the moving image decoding processing program along the flowchart shown in FIG. 10 to operate as the control unit in the embodiment of present invention.

Upon start of the decode processing by the moving image decoding processing program, the data processor 10 proceeds to step 41 to detect the processing parameter (bS: strength parameter or tc: variation parameter). Further, the data processor 10 judges, in the subsequent step 42, whether the deblocking filtering may be omitted or not, based on the processing parameter detected in step 41. When it is judged here that the deblocking filtering may be omitted (for example, when the bS is smaller the value being the reference so that strong filtering is not required), the data processor 10 proceeds to step 4 to execute the special decode processing to omit the deblocking filtering. Otherwise, the data processor 10 proceeds to step 3 to execute the normal decode processing as described above.

This also makes it possible to significantly reduce the processing required for decode per frame though the moving image containing block distortion is possibly reproduced due to omission of execution of the deblocking filtering.

Note that all of the above-described decode processing is realized by the moving image decoding processing program executable by a computer. Therefore, the moving image decoding processing program is introduced into the computer via a computer readable storage medium, thereby making it possible to fulfill the same functions as those in the above-described embodiment to present the same operation and effect.

Further, the software decoder which performs the decode processing via software is described by way of example in the above-described embodiment, but the present invention finds applications also in a moving image decoding apparatus and a moving image decoding method each performing the decode processing by processing by hardware. For example, the decode processing can be realized also by enhancing the function of the system micro-computer 16.

As has been described above, according to the present invention, a moving image decoding apparatus and a moving image decoding method are obtained which are capable of smoothly executing decode of the moving image stream.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A moving image decoding method of decoding a compression-coded moving image stream, the method comprising:
    performing deblocking filtering to reduce block distortion on each decoded frame;
    detecting magnitude of an intra-unit processing load that includes a processing load required for decoding;
    setting a judgment threshold value, from a plurality of judgment threshold values, to judge whether or not to perform the deblocking filtering, the setting of the judgment threshold value comprising comparing each of the judgment threshold values with a processing parameter which is based on a strength parameter that indicates a filtering strength at a boundary between adjacent blocks of a plurality of blocks constituting each frame, the strength parameter depending on the detected magnitude of the intra-unit processing load so that the deblocking filtering is performed only at the boundary having a higher processing parameter as the intra-unit processing load becomes higher, and the processing parameter being obtained by linearly adding the strength parameter;

judging whether or not the processing parameter is greater than the set judgment threshold value; and omitting execution of the deblocking filtering when the processing parameter is judged to be smaller than the set judgment threshold value.

2. A moving image decoding method of decoding a compression coded moving image stream, the method comprising:

performing deblocking filtering to reduce block distortion on each decoded frame;

detecting the magnitude of an intra-unit processing load including a processing load required for decode;

setting a judgment threshold value, from a plurality of judgment threshold values, to judge whether or not to perform the deblocking filtering, the setting of the judgment threshold value comprising comparing each of the judgment threshold values with a processing parameter which is based on a variation parameter that indicates a pixel variation at a boundary between adjacent blocks of a plurality of blocks constituting each frame, the variation parameter depending on the detected magnitude of the intra-unit processing load so that the deblocking filtering is performed only on the boundary having a higher processing parameter as the intra-unit processing load becomes higher, and the processing parameter being obtained by linearly adding the variation parameter judging whether or not the processing parameter is greater than the set judgment threshold value; and omitting execution of the deblocking filtering when the processing parameter is judged to be smaller than the judgment threshold value.

* * * * *